United States Patent [19]

Ishikawa et al.

[11] Patent Number: 4,853,793

[45] Date of Patent: Aug. 1, 1989

[54] CIRCUIT FOR CONVERTING A VIDEO SIGNAL PRODUCED BY A LINE IMAGE SENSOR INTO A BINARY SIGNAL ON THE BASIS OF REFERENCE LEVELS DETERMINED FOR SECTIONS OF THE LINE IMAGE SENSOR USING RESPECTIVE COUNTERS

[75] Inventors: Osamu Ishikawa; Mikihiko Sone; Yoshimi Suzuki, all of Tokyo, Japan

[73] Assignee: Oki Electric Industry Co., Ltd., Tokyo, Japan

[21] Appl. No.: 116,863

[22] Filed: Nov. 4, 1987

[30] Foreign Application Priority Data

Nov. 14, 1986 [JP] Japan ................................ 61-269789
Nov. 14, 1986 [JP] Japan ................................ 61-269788

[51] Int. Cl.⁴ ........................ H04N 1/40; H04N 5/228
[52] U.S. Cl. .................................. 358/464; 358/163; 358/448
[58] Field of Search ............... 358/282, 285, 293, 294, 358/280, 163

[56] References Cited

U.S. PATENT DOCUMENTS

| | | | |
|---|---|---|---|
| 4,133,008 | 1/1979 | Tisue ................................... | 358/282 |
| 4,446,486 | 5/1984 | Itoh ..................................... | 358/282 |
| 4,486,781 | 12/1984 | Wilmer et al. ...................... | 358/163 |
| 4,562,486 | 12/1985 | Suzuki et al. ....................... | 358/282 |
| 4,672,682 | 6/1987 | Naruse et al. ...................... | 358/282 |

FOREIGN PATENT DOCUMENTS 57-104364 6/1982 Japan ................................... 358/294
60-194873 10/1985 Japan ................................... 358/280

OTHER PUBLICATIONS

A. J. Dattilo et al., "Variable Intensity illumination Scanner Calibration System", *IBM Technical Disclosure Bulletin*, vol. 21, No. 9, Feb. 1979, pp. 3546–3547 (358/282).

*Primary Examiner*—James J. Groody
*Assistant Examiner*—Randall S. Svihla
*Attorney, Agent, or Firm*—Spencer & Frank

[57] ABSTRACT

A circuit for converting a video signal into binary signals comprises a line image sensor for performing photoelectric conversion of an object to be read, to produce pixel signals, means for setting reference levels for respective sections of the line image sensor, the sections being divisions of the entire length of the line image sensor, and a comparator for comparing each pixel signal with the reference level for the section to which the pixel signal in question belongs, to produce a binary signal. The setting means includes means for producing digital reference level data and a D/A converter for converting the digital reference level data into an analog reference level signal.

11 Claims, 7 Drawing Sheets

CIRCUIT FOR CONVERTING A VIDEO SIGNAL PRODUCED BY A LINE IMAGE SENSOR INTO A BINARY SIGNAL ON THE BASIS OF REFERENCE LEVELS DETERMINED FOR SECTIONS OF THE LINE IMAGE SENSOR USING RESPECTIVE COUNTERS

BACKGROUND OF THE INVENTION

The present invention relates to a circuit for converting an analog video signal into binary signals in an electronic black board, a telecopier and the like, and particularly to an improvement in setting the slice levels.

Figure 1:
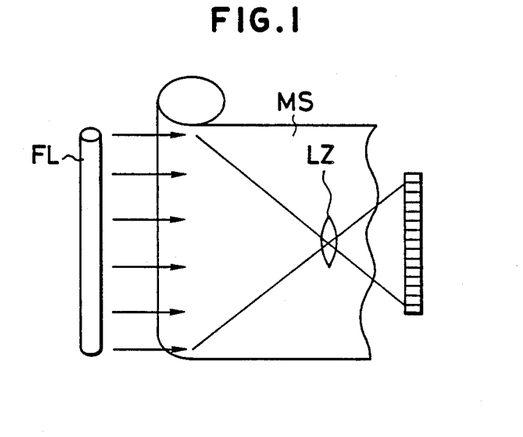
FIG. 1 is a schematic diagram showing the illumination and a line sensor.

In electronic black boards, it is customary to use a fluorescent lamp FL as shown in FIG. 1 to illuminate a movable screen MS on which characters, symbols and pictures are written and light reflected from the movable screen MS is focused by a lens LZ onto a line image sensor such as a linear CCD (charge-coupled device) by which the optical signal is converted into an electric signal, called a video signal. The video signal is compared with a slice level or reference level to produce a series of binary signals indicating black or white of respective pixels.

Figure 2A:
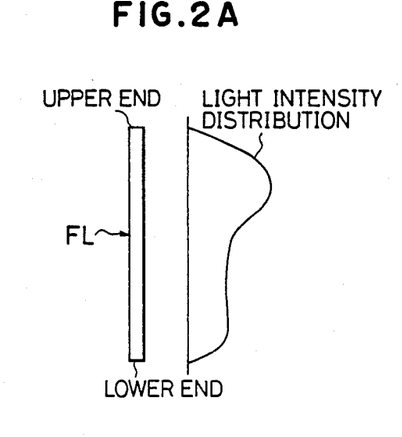
FIGS. 2A and 2B are diagrams showing the intensity distribution of a fluorescent lamp.
Figure 2B:
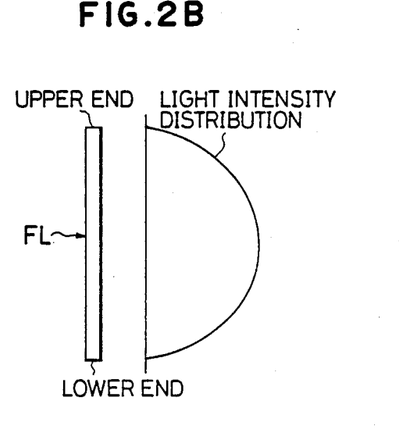

The light intensity of the fluorescent lamp FL is not uniform along its length, and it varies depending on the temperature of the tube. This means that the light intensity distribution varies with time after the fluorescent lamp is turned on. For instance when the fluorescent lamp has just been turned on the intensity is generally low but the upper part of the tube which is heated more quickly has a relatively high intensity, as shown in FIG. 2A. When the entire tube is fully heated, the intensity is the highest at the center and is decreased towards both ends, as shown in FIG. 2B. Moreover, the lens has a property by which the light having passed the lens has the intensity which is increased toward the optical axis.

As a result, the white level of the video signal varies with time and along the length of each scan.

To cope with the nonuniform distribution of the light intensity along the length of each scan, a shading plate having a greater shading rate toward the center has been used. But positioning the shading plate demands extreme accuracy and is time consuming. Moreover it does not provide a measure against the change of the light intensity distribution with temperature.

Figure 3:
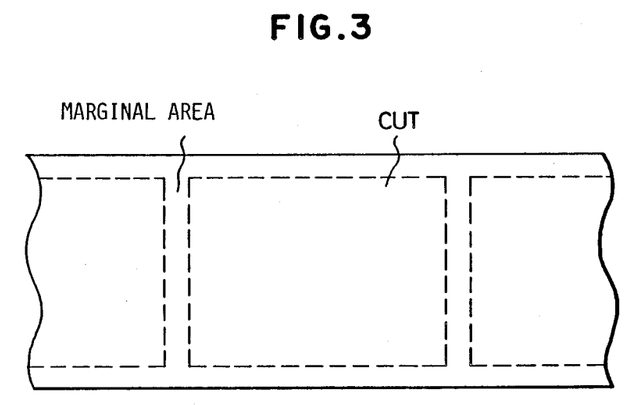
FIG. 3 is a schematic diagram showing an area for each "cut" and a marginal area.

Another solution is to electronically vary the reference level in conformity with the white level variation. This can be done by setting the reference level based on the signal levels obtained from the marginal area of the screen, before the processing of the object image signal (effective video signal) starts. Here, "marginal area" means the area on the screen adjacent to the edge of each "cut" of the images on the screen. By 37 cut" is meant that portion of the screen on which optically readable information to be processed is present, as shown in FIG. 3.

Usually nothing is written on the marginal area. But the user may write on the marginal area and there can be some smear on the marginal area, so that the device is expected to operate properly even if there are some writings or smears in the marginal area.

A prior art arrangement determines the white level for each dot of the line sensor based on data from several lines (scans): the highest of the levels of video signals of the same dot of the sensor obtained through the several lines is taken as the white level and the reference level is set based on the white level. For instance, the reference level is given by multiplying a coefficient, e.g., 0.7 with the white level.

But this prior art arrangement fails to find a proper white level when a black line (a written one or a smear) extends horizontally (normal to the length of the line sensor) over several lines.

SUMMARY OF THE INVENTION

An object of the invention is to permit setting of proper reference levels even when there is a horizontal black line or the like in the marginal area.

According to the invention, the screen is divided along the length of the image sensor into sections and the highest of the video signals within each section over several lines is regarded as the white level for the section and a reference level for the section is determined based on this white level. Here the term "highest" means "m-th highest" where m is a natural number or integer.

DETAILED DESCRIPTION OF THE EMBODIMENTS

Figure 4:
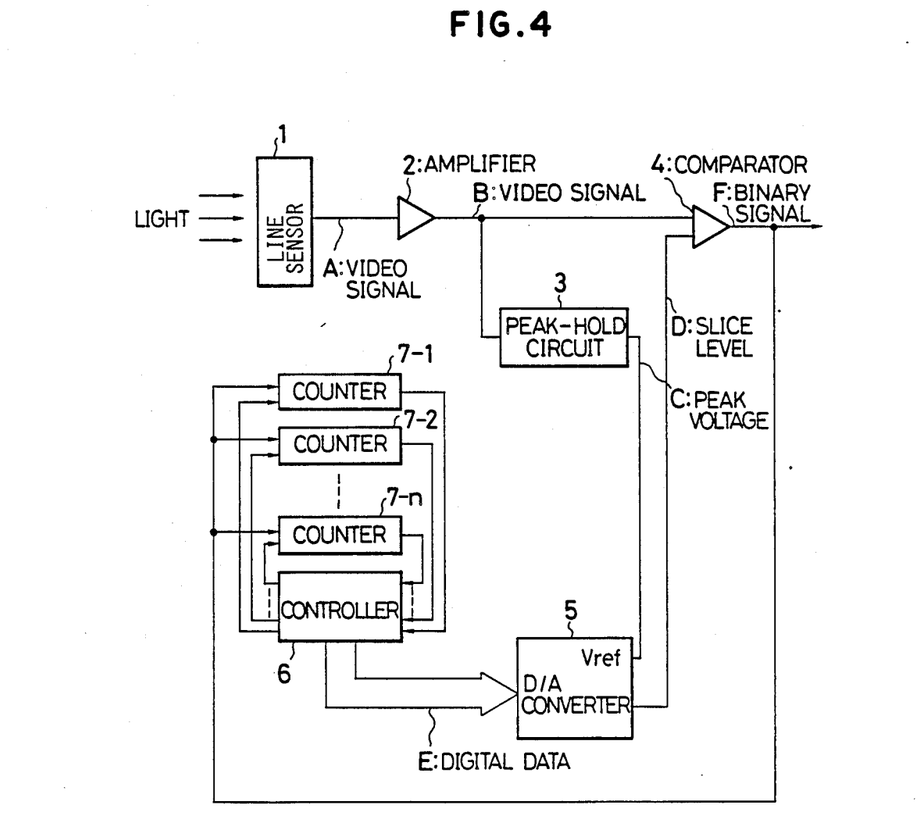
FIG. 4 is a block diagram showing an embodiment of the invention.

An embodiment of the invention will now be described with reference to FIG. 4.

In this embodiment, the entire height (direction parallel to the length of the lines) is evenly divided into 10 sections. The entire line consists of 1280 pixels and each section consists of 128 pixels. The tenth highest value of the pixel signals in each section is found to be the white level of the section. The white level is represented as a digital value of 6 bits, i.e., of 64 steps.

A line sensor 1 receives reflected light from a screen (recording medium) on which letters or pictures are written or drawn, and converts the light into electrical signals to produce a video signal A by scanning.

An amplifier 2 amplifies the video signal A to produce an amplified video signal B, which is input to a peak-hold circuit 3 and a comparator 4.

The peak-hold circuit 3 holds the peak value of the input that has been applied to it, and its output C is input to a reference voltage terminal Vref of a D/A (digital-to-analog) converter 5 to be used as the reference voltage. Supplied to the input data terminal of the D/A converter 5 is digital data E from a controller 6.

The digital data E is converted into an analog signal at the D/A converter 5 using the output (peak value)

from the peak-hold circuit 3 as the reference voltage Vref.

The output of the D/A converter 5 is supplied to the comparator 4 as a threshold or slice level D used during the process of determining the white level.

The comparator 4 compares the video signal B with the slice level D to convert the video signal into a series of binary (pixel) signals F of "1" or "0" depending on whether or not the video signal B is larger than the slice level D. This means "1" corresponds to "white" (or bright) and "0" corresponds to "black" (or dark).

The binary signal F is input to n counters 7-1 to 7-n, which are sequentially enabled by the controller 6. The n counters are alloted to the n sections, respectively, and each counter is enabled when the pixel signals of the corresponding section are processed. The controller 6 in cooperation with each counter (7-1) to (7-n) serves to determine the tenth highest value of the video signals within the corresponding section. This is done by the binary search method. More particularly, the slice level for each section is initially set at the middle, i.e., 64/2. Each counter counts the number of "1" pixels (white pixels) in each section by being enabled while the binary signals of that section are produced. When the number of "1" pixels thus counted is larger than a predetermined value, i.e. 10 (because the tenth highest value of the video signals is being sought), then the slice level is increased by $64/2^2$: if not it is decreased by $64/2^2$. This process is repeated 5 times. The amount by which the slice level is increased or decreased is halved each time the process is repeated, so that at the fifth process, the amount by which the slice level is increased or decreased is $64/2^{5+1} \div 34$. The optimum slice level (the slice level which equals the white level) is thus reached while 5 lines are scanned. This slice level remaining at the end of the binary search is stored in the controller 6, and gives the tenth highest value of the video signals and is used as the white level. The reason that the first highest value of the video signals is not used as the white level is that there can be noise which gives rise to an especially bright spot which should be ignored.

The controller 6 multiplies the white level with a coefficient, e.g., 0.7 to produce a slice level that should be used during processing of effective data, i.e., data from the "cut" in question. This slice level, used during processing of effective data, is called the reference level.

During processing of the effective data, the controller 6 sequentially selects the reference level corresponding to the section of which the pixel signals are being processed.

Figure 5:
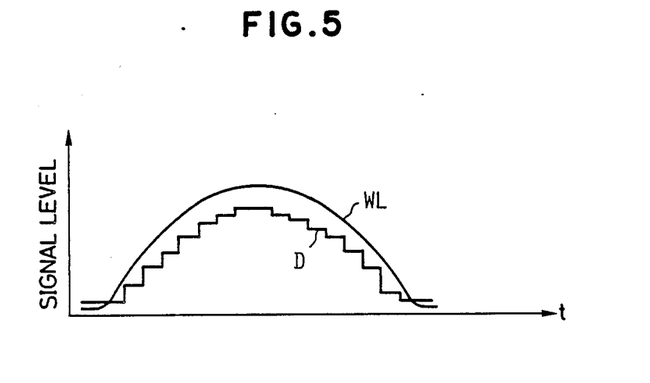
FIG. 5 is a schematic diagram showing reference levels for respective sections.

FIG. 5 schematically illustrates the slice levels D for the respective sections with an example of white level WL along each scan (i.e., along the abscissa).

Figure 6:
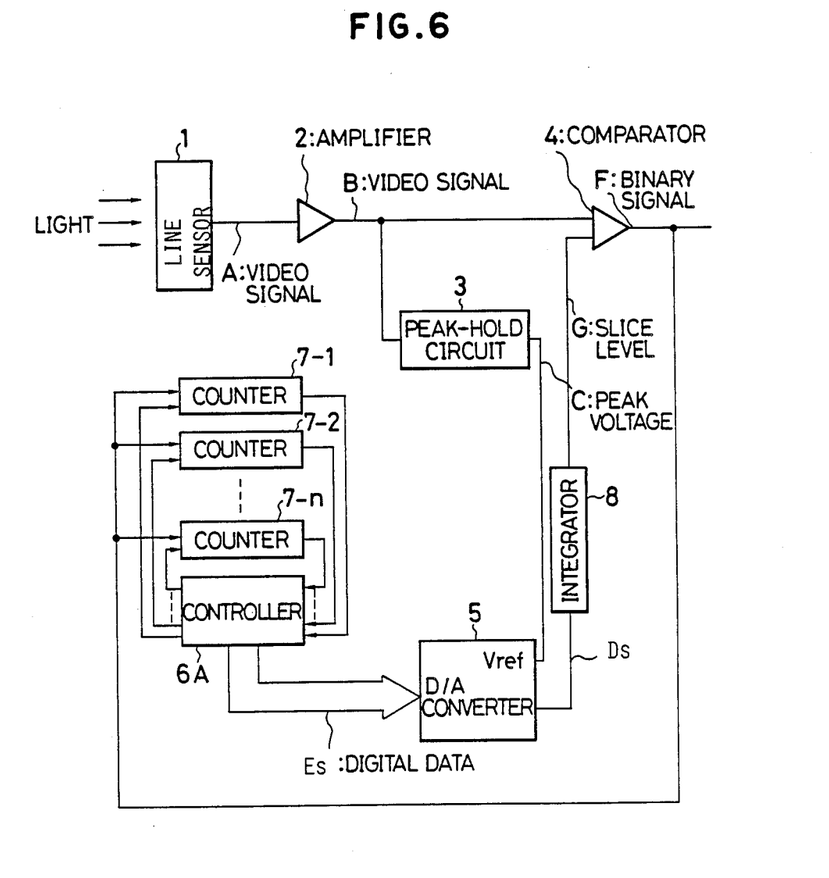
FIG. 6 is a block diagram showing another embodiment of the invention.
Figure 7:
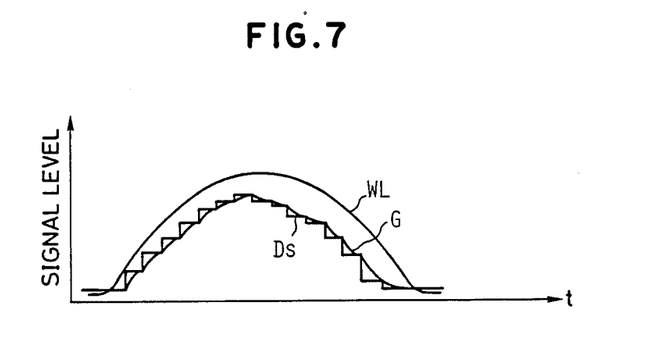
FIG. 7 is a schematic diagram showing reference levels for respective sections.

FIG. 6 shows another embodiment of the invention. The embodiment of FIG. 6 is basically identical to the embodiment of FIG. 4 but it differs in the provision of an integrator 8 inserted between the D/A converted 5 and the comparator 4. In addition, the controller 6A, which is basically identical to the controller 6 of FIG. 4, produces digital data ES representing the lower one of the reference levels of the section of which the corresponding pixel signals are being produced from the line sensor 1 and of the section next (in the order of scan) to the above-mentioned section. Assuming that the white level WL rises gradually until the middle of the line and then gradually falls as shown in FIG. 7, the reference levels Ds are in step with the white level WL in the region (left half in FIG. 7) where the white level WL ascends, and descends earlier than the white level WL in the region (right half in FIG. 7) when the white level WL descends. But the reference level G as output from the integrator 8 is in closer conformity with the white level WL. This is because the integrator's output lags behind its input: its output ascends gradually, behind its input when its input rises stepwise, and its output descends gradually, behind its input when its input falls stepwise.

The integrator 8 can be an RC integrator or a Miller integrator.

The embodiment of FIG. 6 has an advantage in that the reference level has a better comformity with the white level WL throughout each section. This compares with the embodiment of FIG. 4 where the reference level of each section has varying distance from the white level depending on the position within each section.

Figure 8:
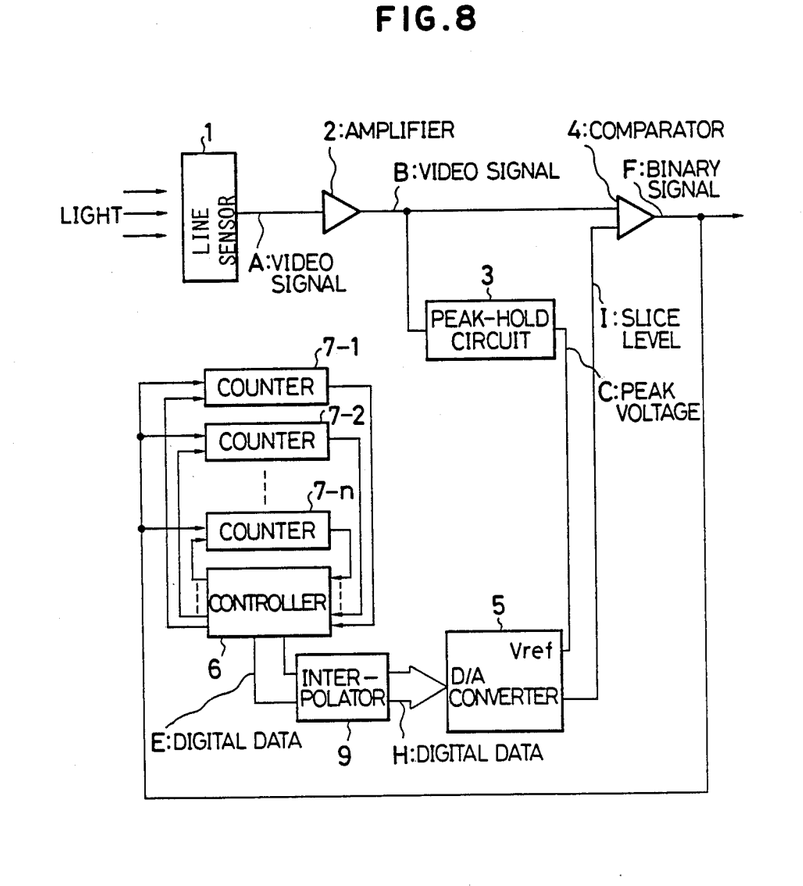
FIG. 8 is a block diagram showing a further embodiment of the invention.
Figure 9:
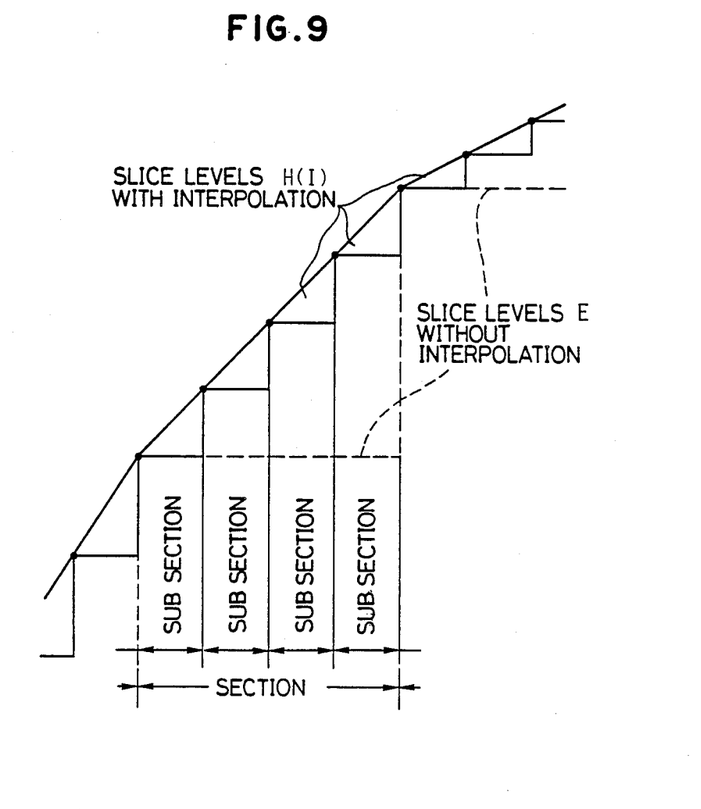
FIG. 9 is a schematic diagram showing reference levels for respective sub-sections.

FIG. 8 shows a further embodiment of the invention. The embodiment of FIG. 8 is basically identical to the embodiment of FIG. 4 but differs in the provision of an interpolator 9 between the controller 6 and the D/A converter 5. During the image reading, the interpolator 9 produces digital data H indicative of interpolated reference levels on the basis of the reference levels E for the respective sections as supplied from the controller. The D/A converter 5 converts the digital signal H into an analog signal I indicative of the interpolated reference level. FIG. 9 shows an example in which each section is divided into four sub-sections and interpolated slice levels are determined for each of the four sub-sections.

What is claimed is:

1. A circuit for converting a video signal comprising a series of pixel signals into a binary video signal comprising a series of binary signals, said pixel signals being obtained by photoelectrically reading an object having an effective area in which information to be read is present and a marginal area outside the effective area, an average brightness level of the marginal area being about the same as a highest brightness level of the effective area, said circuit comprising:

a line image sensor comprising a plurality of sensor elements for photoelectrically reading said object line by line to produce pixel signals indicative of brightness levels of pixels forming each line of the object, each pixel signal being produced by a corresponding one of the sensor elements;

means responsive to the pixel signals produced by the line image sensor for setting respective reference levels for sections into which the line image sensor is divided, each section consisting of a plurality of adjacent ones of the sensor elements; and a comparator for comparing each pixel signal with the reference level for the section to which the sensor element which produced the pixel signal belongs to produce a corresponding binary signal;

wherein said reference level setting means comprises;

means for determining respective white levels for said sections; and means for determining each of said reference levels from the white level for the respective section;

wherein said white level determining means comprises;

means for setting respective slice levels for the sections while line image sensor is reading the marginal area, the slice levels being initially set to arbitrary values when the line image sensor begins to read the marginal area and being input to the comparator as the reference levels while the white level determining means determines the white levels; and respective counters provided for said sections, each counter counting the number of binary signals produced by said comparator while the image sensor is reading a line of the marginal area which indicate that the corresponding pixel signals exceeded the respective slice level;

wherein said slice level setting means changes the slice level for each section for which the count value of the respective counter is not equal to a predetermined value;

wherein said counters and said slice level setting means repeat the processes of counting and changing the slice levels while the line image sensor is reading succeeding lines of the marginal area until the count values of all of the counters become equal to said predetermined value; and wherein the slice levels which are set when the count values of all of the counters become equal to said predetermined value are determined to be the white levels for the respective sections.

2. A circuit according to claim 6, wherein said reference level setting means further comprises:

means for producing digital reference level data representing the reference levels; and a D/A converter for converting the digital reference level data into analog reference level signals representing the reference levels and for inputting the analog reference level signals into the comparator.

3. A circuit according to claim 2, wherein each white level is determined to be equal to the value of the pixel signal having the m-th highest value among the pixel signals produced by the sensor elements in the respective section, where m is an integer greater than one;

said predetermined value is m; and said means for determining said reference levels comprises means for multiplying the respective white levels by a predetermined factor smaller than one and greater than zero.

4. A circuit according to claim 3, wherein the range of the values of the pixel signals produced while the line image sensor is reading the object represents the range of brightness levels of the object, with higher pixel signal values representing higher object brightness levels; and said slice levels are initially set to an arbitrary value which is at the middle of the pixel signal level range, thus representing a brightness level at the middle of the brightness level range.

5. A circuit according to claim 2, further comprising:

a peak-hold circuit for receiving the pixel signals and for holding the value of one of the pixel signals which has the highest value as a peak value;

wherein said D/A converter converts the digital reference level data into analog reference level signals on the basis of a reference voltage, said D/A converter receiving the peak value from the peak-hold circuit as the reference voltage.

6. A circuit according to claim 1, wherein a brightness level of said object is highest at locations on the object where nothing is written or drawn.

7. A circuit according to claim 1, wherein said slice level setting means changes the slice level for each section for which the count value of the respective counter is not equal to the predetermined value in accordance with a binary search pattern while the line image sensor is reading a plurality of lines of the marginal area.

8. A circuit according to claim 1, wherein each counter is enabled when the pixel signals produced by the sensor elements in the respective section are being read out of the line image sensor.

9. A circuit according to claim 1, wherein said reference level setting means further comprises:

means for producing digital reference level data representing the respective reference level for each of the sections;

means for selecting for each of the sections the one of the digital reference level data for that section and the digital reference level data for a corresponding next one of the sections which has the smaller value;

a D/A converter for converting the selected digital reference level data into analog reference level signals; and an integrator for integrating the analog reference level signals to produce integrated analog reference level signals representing the reference levels and for inputting the integrated analog reference level signals into the comparator.

10. A circuit for converting a video signal comprising a series of pixel signals into a binary video signal comprising a series of binary signals, comprising:

a line image sensor comprising a plurality of sensor elements for photoelectrically reading an object to produce said pixel signals, each pixel signal being produced by a corresponding one of the sensor elements;

means for setting respective reference levels for sections into which said line image sensor is divided, each section consisting of a plurality of adjacent ones of the sensor elements; and a comparator for comparing each pixel signal with the reference level for the section to which the sensor element which produced the pixel signal belongs to produce a corresponding binary signal;

wherein said reference level setting means comprises:

means for determining respective white levels for said sections, wherein each white level is determined to be equal to the value of the pixel signal having the m-th highest value among the pixel signals produced by the sensor elements in the respective section, where m is an integer greater than one;

means for determining the reference level for each section from the white level for the respective section;

means for producing digital reference level data representing the reference levels; and a D/A converter for converting said digital reference level data into analog reference level signals representing the reference levels and for inputting the analog reference level signals into the comparator.

11. A circuit for converting a video signal comprising a series of pixel signals into a binary video signal comprising a series of binary signals, comprising:

a line image sensor comprising a plurality of sensor elements for photoelectrically reading an object to produce said pixel signals, each pixel signal being produced by a corresponding one of the sensor elements;

means for setting respective reference levels for sections into which said line image sensor is divided, each section consisting of a plurality of adjacent ones of the sensor elements; and a comparator for comparing each pixel signal with the reference level for the section to which the sensor element which produced the pixel signal belongs to produce a corresponding binary signal; wherein said reference level setting means comprises:

means for producing digital reference level data representing the respective reference level for each section;

means for selecting for each of the sections the one of the digital reference level data for the section and the digital reference level data for a corresponding next one of the sections which has the smaller value;

a D/A converter for converting the selected digital reference level data into analog reference level signals; and an integrator for integrating the analog reference level signals to produce integrated analog reference level signals representing the reference levels and for inputting the integrated analog reference level signals into the comparator.

* * * * *